E. H. ANGIER.
BALING.
APPLICATION FILED JULY 6, 1918.
1,344,785.
Patented June 29, 1920.
3 SHEETS—SHEET 2.
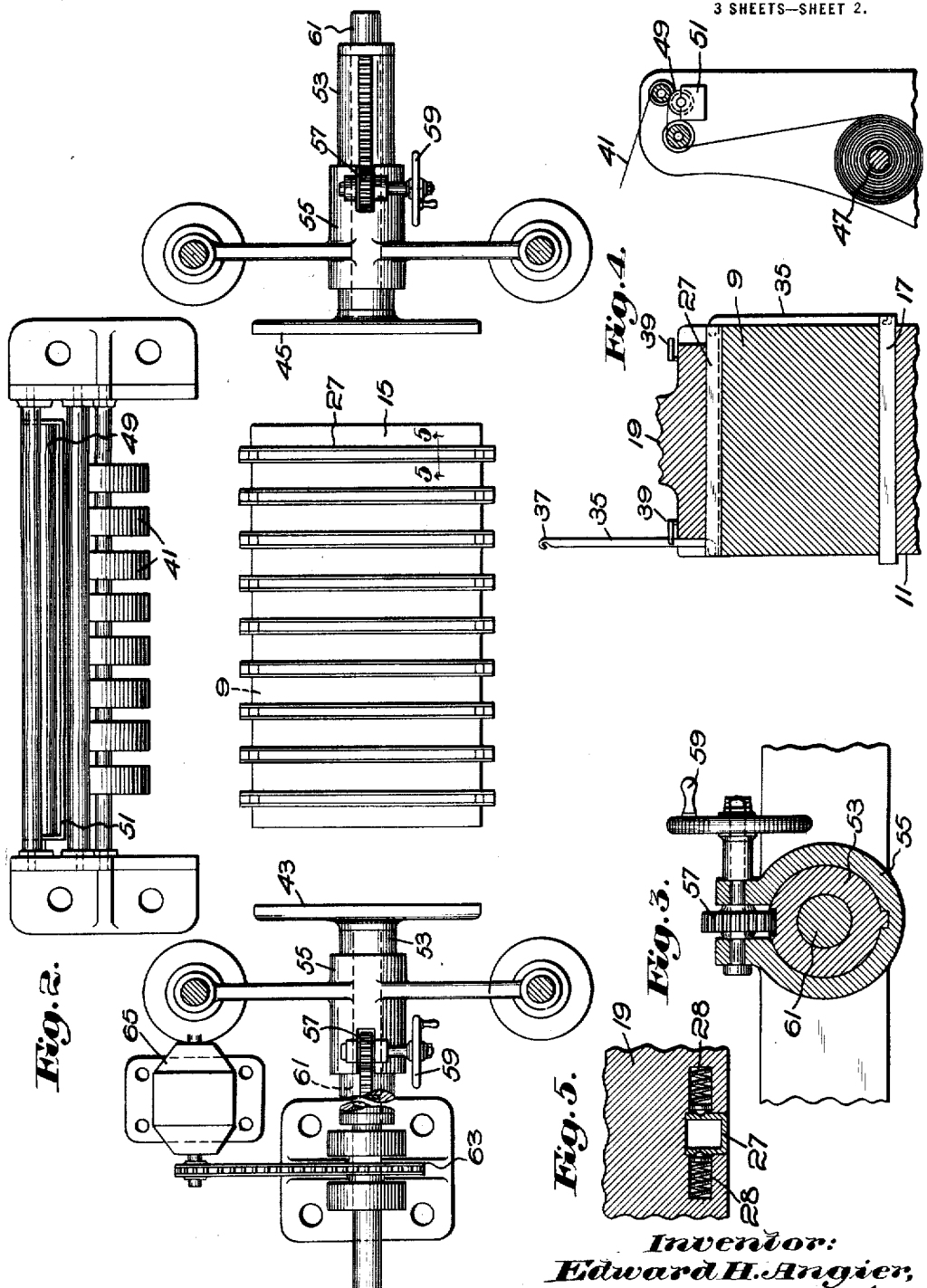

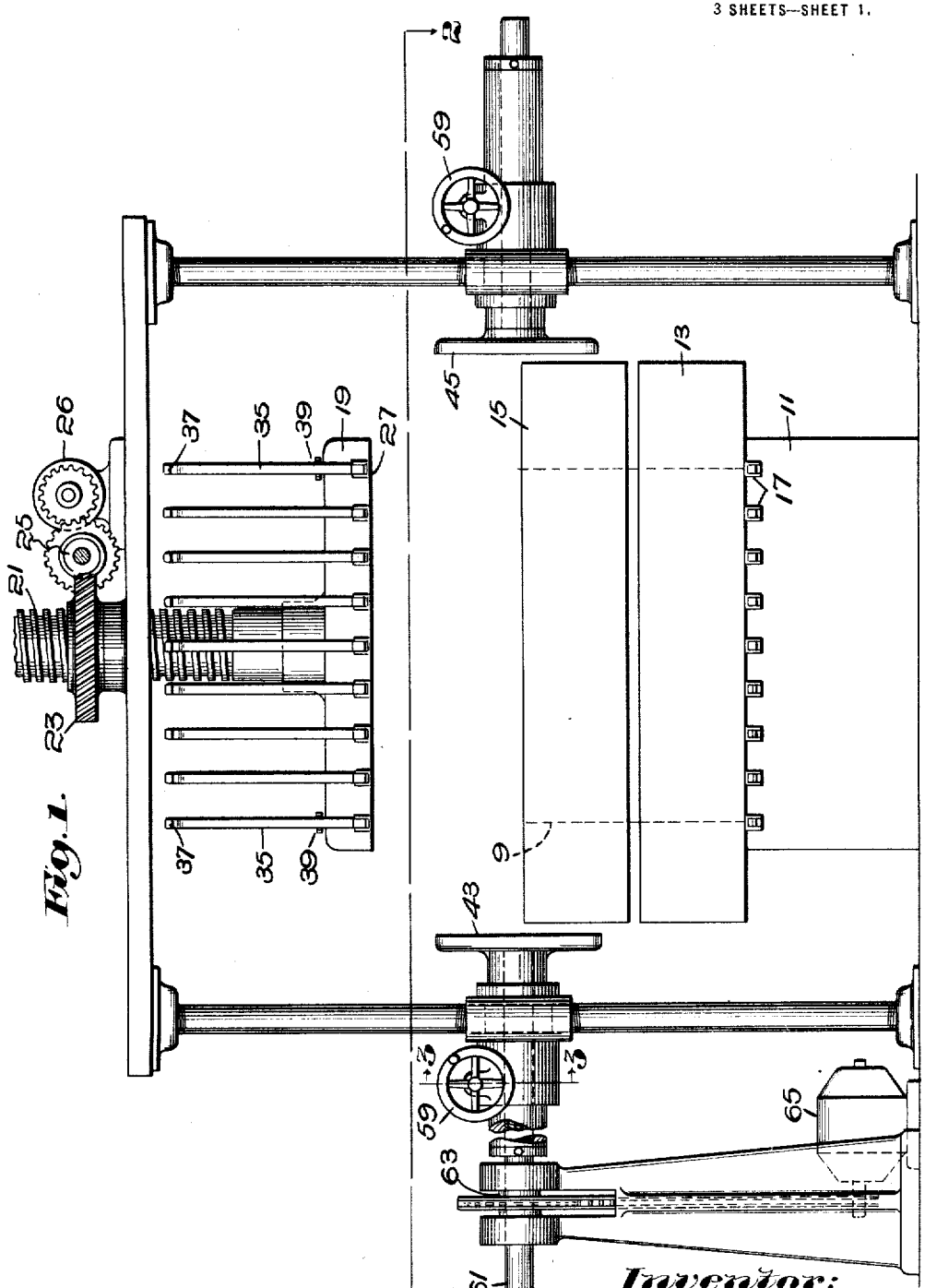

E. H. ANGIER.
BALING.
APPLICATION FILED JULY 6, 1918.

1,344,785.

Patented June 29, 1920.
3 SHEETS—SHEET 3.

Inventor:
Edward H. Angier.
by Emery, Booth, Janney & Varney
Attys.

UNITED STATES PATENT OFFICE.

EDWARD H. ANGIER, OF FRAMINGHAM, MASSACHUSETTS.

BALING.

1,344,785.  Specification of Letters Patent.  Patented June 29, 1920.

Application filed July 6, 1918. Serial No. 243,516.

*To all whom it may concern:*

Be it known that I, EDWARD H. ANGIER, a citizen of the United States, and resident of Framingham, in the county of Middlesex and State of Massachusetts, have invented an Improvement in Baling, of which the following description, in connection with the accompanying drawings, is a specification, like characters on the drawings representing like parts.

This invention relates to a method of baling and to mechanism for practising the same. The more particular objects of my invention are to provide a means for preparing a bale held under high compression in an inclosing paper wrapping, to provide a bale of uniform and regular form and to avoid the use of metal.

My invention will best be understood by reference to the following description of the mechanism shown for purposes of illustration in the accompanying drawings and of its manner of operation which will illustrate the novel method which I have invented. In the drawings:

Figure 1 is a side elevation of the baling press and coöperating mechanism prior to compression;

Fig. 2 is a section on the line 2—2 of Fig. 1 but it is to be understood that compression has been effected and the ram or plunger of the press lifted;

Fig. 3 is an enlarged section on the line 3—3 of Fig 1;

Fig. 4 is a transverse section showing parts of the bale and press immediately after compression;

Fig. 5 is an enlarged section on the line 5—5 of Fig. 2;

Figure 6:
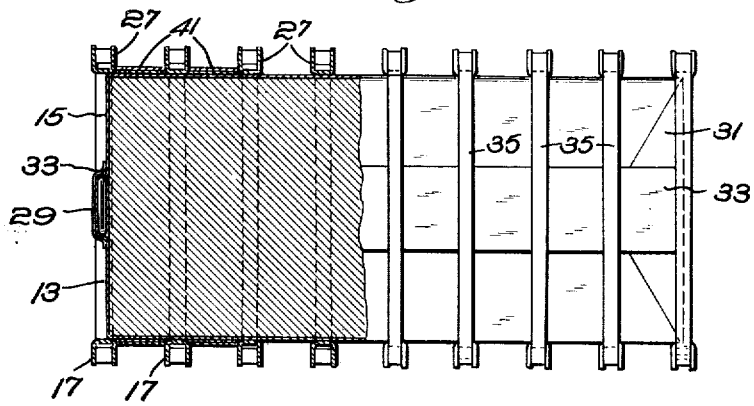
Fig. 6 is a side elevation of the bale at an intermediate stage of its preparation, partly in section.

Referring to Fig. 1 of the drawings, I have there shown a baling press and coöperating mechanism suitable for preparing a bale in accordance with my improved method. My method is applicable to bales made by the use of a form in which the material is compressed, but to simplify the disclosure I have here shown a so-called open-sided baling process and it is to be supposed that the material to be baled 9 has first been subjected to a preliminary compression in some suitable mechanism bringing it approximately to its final form as shown in Fig. 1 and that it is held in such form by temporary ties such as cords, which may be cut away after the ram or plunger of the press has engaged the material.

Referring to Fig. 1, the preliminarily formed bale 9 is placed upon the platform 11 with a suitable wrapping sheet 13 beneath the same and a similar sheet 15 over the top. These sheets are preferably made of a number of thicknesses of stout paper connected together by a waterproof adhesive in which may be embedded reinforcing threads. A suitable material is shown in Patent No. 1,269,140, dated June 11, 1918, to William M. Wheildon. After compression of the material has been effected the edges of the sheets are to be joined about the compressed bale as will hereinafter more fully appear.

The platform 11 may be provided with suitable grooves in which are set, preferably flush therewith, transverse bars 17 which may take the form of channel irons as herein shown. These bars are of appreciable width and are substantially rigid transversely of the bale. Opposed to the platform 11 is a ram or plunger 19 adapted to be lowered toward the platform in any suitable manner. I have herein shown a screw 21 adapted to be driven by the nut 23 which carries a worm wheel adapted to mesh with a worm 25 driven by suitable power such as electric motor 26.

The ram 19 is adapted to carry bars 27 corresponding to the bars 17 of the platform 11, these bars being preferably set flush with the face of the ram 19 and being of appreciable width and substantially rigid. As shown in Fig. 5, spring catches 28 may be provided to hold bars 27 in place. These catches are sufficiently strong to support the weight of the bars but not the weight of the complete bale, so that they may separate from the ram at a later time in the operation of the mechanism as will hereafter appear.

As the ram 19 is lowered toward the platform 11 the material on the latter is, in the present instance, subjected to a uniform compression between two substantially continuous surfaces. When compression has been effected and before the ram is again raised (see Fig. 6) the margins of the sheets 13 and 15 are preferably connected together, conveniently by a rolled or locked joint 29 across the ends of the bale. They may then be folded over in plaits or folds 31 at the sides of the bale and are conveniently joined as by means of the adhesive sealing strip 33. In Fig. 6 the necessity of exaggerating the thickness of the sheets has necessitated a somewhat misleading showing at the left hand side of the figure. It will be understood that the sealing strip 33 overlies the joints 29 and the margins thereof are sealed to the sheets 13 and 15 at either side of that joint.

In accordance with my invention I now connect the elements of opposed pairs of bars 17 and 27 in order to maintain the bale temporarily under compression and for this purpose (see Figs. 1 and 4) I have herein provided side bars 35 hinged to the ends of the bars 27 and having terminal hooks 37 adapted to engage with suitable means on the lower bars 17. As seen in Fig. 4 these bars may be so constructed as to lie, when in the raised position shown at the left hand side of Fig. 4 and in Fig. 1, within the margins of the press plunger so that the latter can be utilized with a closed baling form, if desired. Suitable spring catches 39 (Fig. 4) may be provided to hold the side bars in elevated position until it is desired to fold down the same to connect the bars 27 with the bars 17.

In Fig. 4 I have shown the right hand bar 35 folded down and the left hand bar still in its elevated position. After all the bars have been folded down the ram is raised, the expansion of the bale will lock the hooks 37 in place, the catches 28 (Fig. 5) will release bars 27 and the bale will rest on the platform substantially as in Fig. 6, surrounded and held under compression by a number of encircling rigid-sided frames.

Figure 7:
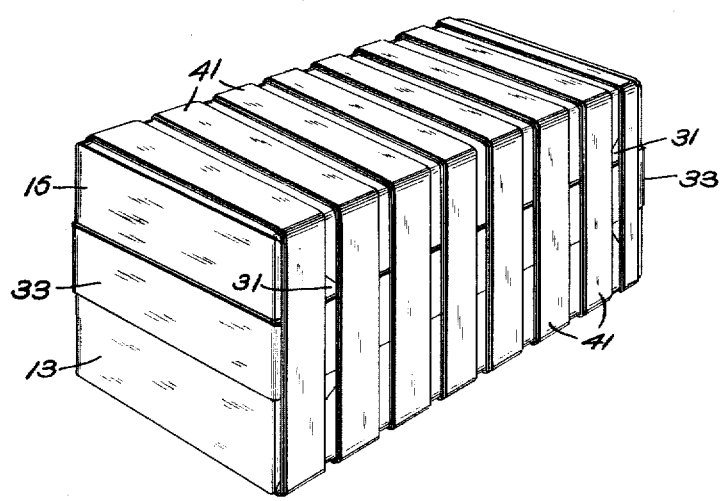
Fig. 7 is a perspective view of the completed bale.

Referring to Fig. 6, I now complete the bale by covering the comparatively wide spaces between adjacent frames with a wrapping of non-metallic material and thereafter these frames may be removed and the material will then be held under compression by these broad encircling bands as shown in Fig. 7. Preferably these encircling bands take the form of strips 41 of reinforced paper such as that shown in my Patent No. 1,167,466, dated Jan. 11, 1916, which may be of a width to fit between the frames and are sealed to the inner wrapping sheets 13 and 15 and wound around as shown in Figs. 6 and 7 in a plurality of superposed turns each one of which is sealed to the preceding one. Beside the resistance provided by the turns of the material this provides for a resisting adhesive joint the length of which is several times the transverse circumference of the bale.

These ties may be applied in any suitable manner but I have herein shown a pair of chucks comprising a head stock 43 and a tail stock 45 associated with the baling press and adapted to engage either end of the completed bale to permit the same to be rotated. As seen in Fig. 4, the paper strip 41 may be carried adjacent the press in a number of suitable rolls 47 and may be led from these rolls over a moistening or adhesive applying roller 49 running in a tank 51. As suggested by Figs. 2 and 4, the strips 41 may be drawn directly from the rolls 47 and applied to the bale between the frames formed by the bars 17, 27 and 35, and if the bale is then rotated by means of the chucks 43 and 45 they will be drawn about the same in a plurality of turns which will be sealed one to another.

The chucks 43 and 45 (see Fig. 3) are herein journaled in sleeves 53 splined in supporting frames 55 at either end of the baling press. The sleeves may be advanced and retracted by means of the pinions 57 actuated by hand wheels 59 so that they may be moved from the position of Fig. 1 inwardly to engage the ends of the completed bale. Herein the shaft 61 of the head stock 43 has slidable thereon a sprocket wheel 63 by which it may be driven, as by a suitable motor 65, to rotate the bale.

Preferably, as shown in Fig. 1, the endmost bars 17 and 27 are in such position as to lap the end of the completed bale so that a rigid frame will be formed overhanging the end thereof as seen in Fig. 6, and the chucks 43 and 45 are adapted to fit therein so as to support the bale during rotation by engagement with these frames and without necessarily any material pressure on the bale itself. After the material has been compressed and the frames joined about the same, the bale inclosed by the rigid frames may be lifted in any convenient manner clear of the platform 11. For example, the ram may be utilized to elevate the same until it is in position to be engaged by the chucks 43 and 45 which are then moved in, the strips 41 are led from their rolls 47 and the ends secured to one of the interior wrapping sheets 13 or 15, and the entire bale is then rotated until a sufficient number of turns of the strip 41 have been applied about the same.

While my invention is not in all respects limited thereto, I prefer to so proportion the sizes of the bars 27 and 17 and their points of application as to minimize swelling of the bale and to provide it with as smooth and regular a surface as possible. While my completed bale as shown in Fig. 7 to an extent reverses the present practice in that the retaining ties formed by the strip 41 are comparatively broad and cover the major portion of its surface and are separated by relatively narrow spaces, it is my intention, nevertheless, to make the bars 17 and 27 of some width as distinguished from wire bale ties which would cut into baled material and would allow the bale to bulge between the ties before the strips 41 were applied. It will be noted by referring to Fig. 1 that the material is initially compressed between two substantially continuous surfaces so that initially there is no tendency for local bulging, and I conveniently form the bars of such width as to maintain this compression without any substantial bulging of the material between them. The longitudinal rigidity of the bars, that is, rigidity transverse to the bale, also coöperates in preserving the flat-sided form of the completed bale. The showing in the drawing is necessarily somewhat diagrammatic in view of the scale on which it has been necessary to illustrate the invention, but I prefer to space the bars regularly and to make them of such dimensions that the surface engaged by them will be from two to five tenths of the total length of the bale and may conveniently be in the neighborhood of one-third thereof. For example, in applying my invention to the baling of clothing for army use and for a bale thirty inches in length, I might use bars an inch in width and spaced one and one-half inches apart to receive a one and one-half inch reinforced strip 41 between them.

The broad band-like nature of the encircling bindings formed by the strips 41 and the comparatively narrow spaces between them prevent local bulging or swelling of the bale after the frames have been removed, although since these bands are flexible the pressure on them in equalizing will give the top and bottom faces of the bale a slight and gentle curvature from edge to edge. The bale, however, will be regular in form and as nearly as possible parallelepipedal.

By my improved method, as explained incidentally in the course of the preceding description, I am enabled to provide a bale inclosed in a paper covering, conveniently a water-proof covering, in which the use of metal has been eliminated and wherein, nevertheless, the bale is under high compression. Practically the full compression which can be applied by the baling machinery is retained in the wrapped article. The baled material is uniformly held over the major portion of its surface by the broad encircling bands 41. Hitherto, where it has been attempted to cover baled material with paper sheets and hold them by encircling bands of metal the act of tensioning the metal ties was likely to result in puncturing of the paper by the tensioning tool and in any event the expansion of the material between the ties, when the press ram was raised, tended to burst the inclosing sheets of paper. In the bale as shown in Fig. 7 but little tension is placed upon the sheets 13 and 15 which are simply to provide a continuous covering. The bale is held by the broad bands 41 which may be built up of ample strength, the application of which does not endanger the integrity of the sheets 13 and 15, and which do not permit a disrupting tension to be placed upon the same between adjacent bands. Since the baled material is firmly held by the rigid frames, it is unnecessary to strain the strips 41 in applying them. They need be tensioned only sufficiently to apply them smoothly and are not subject to marked strain until after they have been built up as compound bands, as shown in Fig. 6, and the adhesive has set in the long joint between the turns to provide a great resistance. The bale is so firmly held by the frames that the paper bands are readily applied with evenness so that the pressure thereon in the completed bale is uniform. Since the encircling bands formed by the strips 41 are sealed to the inclosing covering and are in effect merged into the same as an integral part thereof, the bands may be placed very near the end of the bale and there is no danger of their slipping off, as in the case of a metal tie, if the bale is temporarily deformed. The end of the bale is thus held in shape and permanently reinforced.

It will be understood that any further exterior wrapping may be applied, if desired, over the so-called completed bale as shown in Fig. 7.

The bale here disclosed is claimed as an article in my copending application, Serial No. 243,515, filed July 6, 1918.

Having thus described, for purposes of illustration, one form of my invention the principles exemplified thereby which I claim as new and desire to secure by Letters Patent I shall express in the following claims:—

1. A method of baling comprising compressing the material, surrounding it with comparatively narrow ties while under compression and wrapping the space between said ties to provide broad, band-like, permanent ties surrounding the completed bale.

2. A method of baling comprising compressing the material, surrounding it with comparatively narrow ties while under compression and encircling the bale between adjacent ties with a plurality of turns of flat band-like material secured adhesively one to another.

3. A method of baling comprising compressing the material between pairs of opposed rigid bars, connecting said bars to provide rigid-sided frames about the bale, encircling the bale between said frames with permanent ties comprising bands wound in a plurality of cohering convolutions and removing the frames.

4. A method of baling comprising compressing the material between pairs of opposed rigid bars, connecting said bars to provide rigid-sided frames about the bale, covering the spaces between the frames with wrapping material applied to form encircling bands and removing the frames.

5. A method of baling comprising compressing the material between covering sheets, folding the sheets thereabout, maintaining the compression by encircling frames having substantially rigid sides and wrapping the bale between said frames with flexible bands each having an adhesive face causing it to adhere to the covering sheets and to itself.

6. A method of baling comprising compressing the material, adjusting a skeleton form about the same to maintain the compression, wrapping the bale with adhesive strip in the interstices of the form and removing the form.

7. A method of baling comprising compressing the material between members of appreciable width spaced substantially to exclude bulging of the material between them, connecting said members across the sides of the bale to hold the compression, wrapping bindings about the bale between said members and thereafter removing the members.

8. A method of baling comprising compressing the material between rigid members of appreciable width spaced substantially to exclude bulging of the material between them, connecting said members across the sides of the bale to hold the compression, wrapping bindings about the bale between said members and thereafter removing the members.

9. A method of baling comprising compressing the material between elements having removable inset members providing substantially continuous surfaces whereby to effect uniform compression, connecting said members to maintain the material under compression, covering the spaces between them with a wrapping and removing said members.

10. A method of baling comprising compressing material between regularly spaced, opposed pairs of members of appreciable width, connecting the elements of the pairs to maintain said compression, covering the spaces between them with flexible, non-metallic wrapping material and removing said members, the surface engaged by said members being from two to five tenths of the length of the bale whereby a completed bale is provided substantially smooth from end to end.

11. A method of baling comprising compressing material between regularly spaced, opposed pairs of members of appreciable width, connecting the elements of the pairs to maintain said compression, covering the spaces between them with flexible, non-metallic wrapping material and removing said members, the surface engaged by said members being in the neighborhood of one-third the length of the bale.

12. Baling mechanism comprising opposed transversely grooved press elements and removable bars in said grooves rigidly supported substantially flush with the faces of the elements.

13. Baling mechanism comprising opposed press elements having removable transverse bars flush-set therein and means for connecting corresponding bars of the two elements.

14. Baling mechanism comprising opposed press elements carrying removable transverse bars and means for connecting the bars of the two elements at both ends to provide a skeleton three-dimensional bale-inclosing form.

15. Baling mechanism comprising a grooved bed having removable transverse bars rigidly supported in grooves substantially flush with the face thereof, an opposed grooved plunger also having removable transverse bars rigidly supported in the grooves substantially flush with the face thereof and means temporarily to retain the latter bars in position.

16. Baling mechanism comprising a grooved bed having removable transverse bars in the grooves thereof, an opposed grooved plunger having corresponding transverse bars and connecting members hinged to the bars of one set and having provision for releasable engagement with those of the other.

17. Baling mechanism comprising a grooved bed having removable transverse bars in the grooves thereof, an opposed grooved plunger having corresponding transverse bars and connecting members hinged to the bars of the plunger and arranged to fold back within the outline of the same, said members having provision for releasable engagement with those of the bed.

18. Baling mechanism comprising separable frames to hold the compressed bale and coöperating rotatable chucks adapted to engage two of said frames and support the bale thereby.

In testimony whereof, I have signed my name to this specification.

EDWARD H. ANGIER.